W. J. NUSBAUM.
AUTOMOBILE TOOL.
APPLICATION FILED NOV. 20, 1920.
1,424,514.
Patented Aug. 1, 1922.
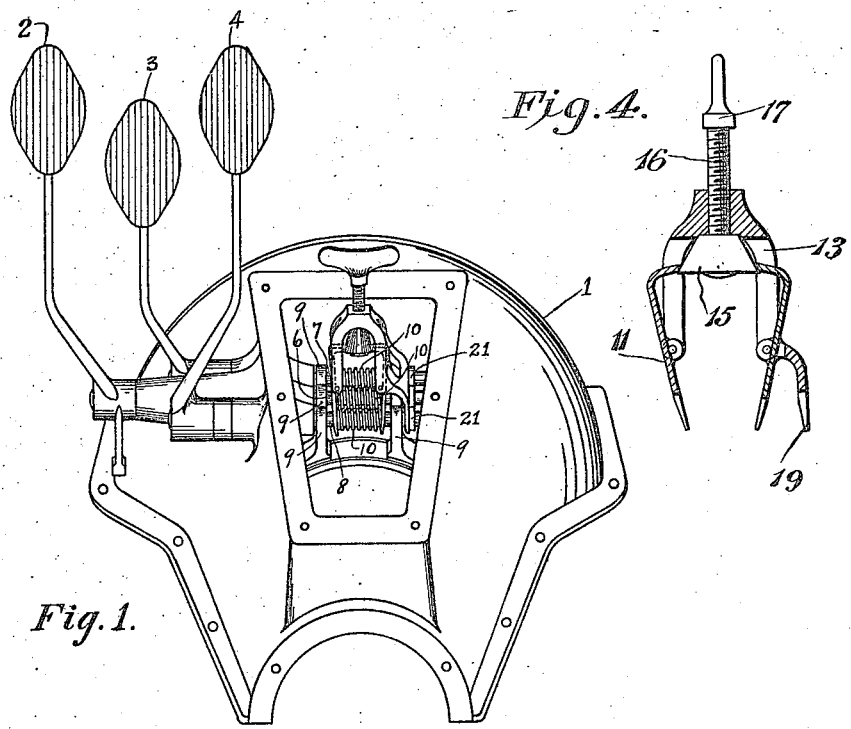
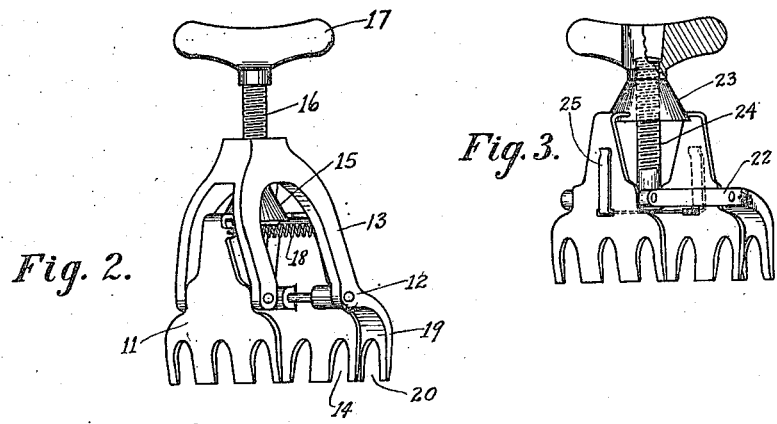
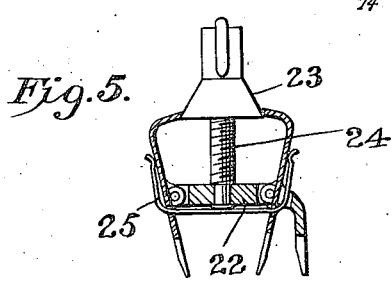
Wilbur J. Nusbaum
Inventor

UNITED STATES PATENT OFFICE.

WILBUR J. NUSBAUM, OF WASHINGTON, DISTRICT OF COLUMBIA, ASSIGNOR OF ONE-THIRD TO GEORGE W. NUSBAUM, OF TAKOMA PARK, MARYLAND, AND ONE-THIRD TO ROBERT L. BAXTER, OF WASHINGTON, DISTRICT OF COLUMBIA.

AUTOMOBILE TOOL.

1,424,514. Specification of Letters Patent. Patented Aug. 1, 1922.

Application filed November 20, 1920. Serial No. 425,511.

*To all whom it may concern:*

Be it known that I, WILBUR J. NUSBAUM, a citizen of the United States, residing at Washington, in the District of Columbia, have invented certain new and useful Improvements in Automobile Tools, of which the following is a specification.

My invention relates to improvements in automobile tools and especially to tools for use with automobiles having a planetary system of transmission, such as the Ford, wherein the planetary gears for slow speed, reverse and brake are operated principally by foot pedals, each pedal being connected to a separate band encircling respectively the slow speed (or clutch) drum, the reverse drum and the brake drum. These bands are tightened by the use of the pedals and loosened by the action of helical springs interposed between extensions of the bands.

It is a well known fact among Ford owners and repairmen that the renewing of transmission band linings in a Ford automobile is a difficult and tedious task. After the bands have been properly relined and placed in position on their respective drums, the housing carrying the shafts of the clutch, reverse and brake pedals must be replaced. In replacing this housing it is necessary to compress the three springs which after assembly keep the bands loose on the drums, and insert the transmission band projections between the springs and the washers on the shafts. This operation is made difficult because of the fact that the heavy housing carrying the shafts must be handled in connection with the spring and band assembly. The task consumes on an average of two hours of very trying work, for no sooner than one shaft, band and spring is properly assembled and the next one is under way, the first spring jumps out of position.

The device which constitutes the present invention presents a ready means of uniformly and simultaneously compressing the three springs, holding them compressed and in such position that the projections of the bands may easily be inserted between the springs and the shaft washers on one side and between the springs and housing bearings on the other side. The saving of time is very great and an otherwise difficult job is easily accomplished. An additional advantage gained through the use of a tool such as is described herein is the saving of the gasket which fits between the housing and the main transmission case, as the usual juggling frequently ruins this gasket.

My invention consists of certain novel details of construction and combinations of parts which will be hereinafter more fully described and pointed out in the claims.

The invention will be more fully understood from the following description in connection with the accompanying drawing forming part hereof, in which,—

Figure 1 is a perspective view of the top housing of a transmission case of a Ford automobile showing my automobile tool in operation, and Figure 2 is an enlarged perspective view of the device, and Figure 3 is an enlarged perspective view of a simpler form of the device, embodying the same principles.

Figure 4 is a vertical longitudinal section through the structure shown in Figure 2.

Figure 5 is a similar section through the structure shown in Figure 3.

Referring to the drawings, 1 represents the transmission cover of a Ford automobile and 2, 3 and 4 the clutch, reverse and brake pedals respectively, with corresponding shafts 6, 7 and 8 which engage the projections 9 of the transmission bands. The pedals cooperate with the springs 10, in connection with the projections of the bands to tighten or loosen the bands on the drums of the transmission gears.

The tool constituting the present invention includes opposed leaves 11 which are pivotally mounted, as at 12, upon opposite portions of a body 13, which in the form shown in Figures 1 and 2 constitutes a frame; a series of notches 14 is provided in one end of each leaf 11 while the other end portions of the leaves are spaced apart by a spreading member 15. This member can be a cone carried by a screw 16 threaded within the body 13 and having any suitable means, such as a head 17, for rotating it. A coiled spring 18 or the like connects the opposed leaves so as to hold them normally in contact with the spreading member 15. A stationary jaw 19 is extended from the body 13 and has a series of notches 20 similar to the notches 14.

In using the tool, the housing 1 together with the shaft 6, 7 and 8 and springs 10 is lifted from position and placed on a bench or on the floor where space is not restricted and the workman is not compelled to assume an awkward or unnatural position. The bands are then removed, relined and replaced on their respective drums. The notched ends of the leaves 11 are then moved apart by lowering the spreading member 15 so that the spring 18 will pull the upper ends of the leaves toward each other. The tool is then lowered into the housing 1 to position the notches 14 and 20 on the shafts 6, 7 and 8 so that the springs 10 will be located between the leaves 11, and the jaw 19 will be located between the springs 10 and the collars 21 on the shafts 6, 7 and 8. The screw 16 is then operated to draw the spreading member 15 upwardly so that the leaves 11 will swing toward each other at their lower ends, thereby compressing the springs 10 and holding them properly spaced from the collars 21. With the parts thus assembled the housing, with the tool in position therein, is lowered into place so that the shafts 6, 7 and 8 will become seated in the projections 9 of the transmission bands. The spreading member 15 is then moved downwardly by the screw 16, thereby allowing the springs 10 to expand and also permitting the tool to be withdrawn. The bands are now properly assembled and the top housing 1 of the transmission case can be secured and the bands adjusted.

Instead of providing a body such as has been shown at 13, the leaves 11 can be pivotally connected to opposite side portions of a plate 22 as illustrated in Figure 3. In this form of device the spreading element 23 is in the form of a conical nut engaging a stationary screw 24 upstanding from the plate 22. A leaf spring 25, which can be U-shaped, extends across the plate and through the leaves 11, the ends of this spring pressing against the leaves so as to hold the upper ends of the leaves in contact with the spreading member.

What is claimed is:

1. In a tool of the character described, a body, a stationary jaw, opposed leaves movably connected to the body, and means supported by the body for shifting the leaves toward each other at one end and relative to the jaw.

2. In a tool of the character described, a stationary jaw, opposed leaves movably connected to the body, a screw, and means carried by the screw for shifting the leaves toward each other at one end and relative to the jaw.

3. In a tool of the character described, a body, a stationary jaw, opposed leaves movably connected to the body, said jaw and leaves having alignment notches, and means movable relative to the body for shifting the notched ends of the leaves toward each other and relative to the jaw.

4. In a tool of the character described, a body, a stationary jaw extending therefrom, opposed leaves movably connected to the body, said leaves and jaw having aligning notches, a screw, and means carried by the screw for shifting the leaves toward each other at one end and relative to the jaw.

5. In a tool of the character described, a body, a stationary jaw extending therefrom, opposed leaves movably connected to the body, said leaves and jaw having aligning notches, a screw, and a conical spreading member carried by the screw for shifting the leaves toward each other at one end and relative to the jaw.

6. In a tool of the character described, a body, a stationary jaw extending therefrom, opposed leaves pivotally connected to the body, said leaves and jaw having aligning notches, a screw, a conical spreading member carried by the screw and adjustable between the leaves to shift the notched ends of the leaves toward each other and relative to the jaw.

7. In a tool of the character described, a body, opposed leaves movably connected to the body, said leaves having aligning notches, a screw, and a conical spreading member carried by the screw for shifting the leaves toward each other at one end.

8. In a tool of the character described, a body, opposed leaves movably connected to the body between their ends, a screw, and a spreading member carried by the screw for shifting the leaves toward each other at one end.

9. In a tool of the character described, a body, opposed leaves pivotally connected to the body between their ends, a screw, and a spreading member supported solely by the screw and shiftable along the leaves to move the leaves toward each other at one end.

10. In a tool of the character described, a body, opposed leaves pivoted between their ends to the body, and a spreading member movable between the leaves at one end to shift the other ends of the leaves towards each other.

11. In a tool of the character described, opposed leaves, means at one end of the leaves and movable relative thereto for shifting the other ends of the leaves toward each other, and a body between and movably engaged by intermediate portions of the leaves, said body connecting the leaves.

WILBUR J. NUSBAUM.